United States Patent [19]

Takagisi et al.

[11] Patent Number: 5,080,946
[45] Date of Patent: Jan. 14, 1992

[54] OPTICAL INFORMATION RECORDING MEDIUM AND RECORDING METHOD

[75] Inventors: Yosikazu Takagisi; Kunihiko Ootaguro; Emiko Hamada; Toru Fujii, all of Tokyo, Japan

[73] Assignee: Taiyo Yuden Co., Ltd., Tokyo, Japan

[21] Appl. No.: 549,114

[22] Filed: Jul. 6, 1990

[30] Foreign Application Priority Data

| Jul. 24, 1989 | [JP] | Japan | 1-191148 |
|---|---|---|---|
| Feb. 5, 1990 | [JP] | Japan | 2-24540 |
| Feb. 5, 1990 | [JP] | Japan | 2-24541 |
| Feb. 5, 1990 | [JP] | Japan | 2-24542 |
| Feb. 5, 1990 | [JP] | Japan | 2-24543 |

[51] Int. Cl.$^5$ .................................... B32B 3/02
[52] U.S. Cl. ........................... 428/64; 428/65; 428/204; 428/206; 428/913; 430/311; 430/945; 346/76 L; 346/135.1; 369/272; 369/284; 369/286; 369/288
[58] Field of Search ............ 369/272, 284, 286, 288; 346/76 L, 135.1; 430/311, 945; 428/64, 65, 204, 206, 913

[56] References Cited

U.S. PATENT DOCUMENTS

| 4,359,750 | 11/1982 | Howe | 346/135.1 |
|---|---|---|---|
| 4,547,875 | 10/1985 | Ohta et al. | 369/275 |
| 4,954,380 | 9/1990 | Kanome et al. | 346/135.1 |

FOREIGN PATENT DOCUMENTS

2131222  6/1984  United Kingdom .

OTHER PUBLICATIONS

Patent Abstracts of Japan, vol. 11, No. 362 (P-640) (2809), Nov. 26, 1987 & JP-A-62 137745 (Matsushita Electric Industrial Co. Ltd.), Jun. 20, 1987.

Primary Examiner—Patrick J. Ryan
Attorney, Agent, or Firm—Oblon, Spivak, McClelland, Maier & Neustadt

[57] ABSTRACT

An optical information recording medium comprising a light transmitting substrate having a spiral pregroove formed on its surface, a light absorptive layer of a coloring matter formed on the substrate directly or with other layer interposed therebetween, and a light reflective layer made of a metal film formed on the light absorptive layer directly or with other layer interposed therebetween, wherein $\Delta S \leq 0.3$ wherein $\Delta S$ is the optical phase difference represented by $\Delta S = 2d_{sub}\{n_{sub} - n_{abs}(1 - d_{abs}/d_{sub})\}/\lambda$ wherein $d_{sub}$ is the depth of the layer boundary on the substrate side of the light absorptive layer at the portion corresponding to the pregroove, $d_{abs}$ is the depth of the layer boundary on the light absorptive layer side of the light reflective layer at the portion corresponding to the pregroove, $n_{sub}$ is the real part of the complex refractive index of the substrate and any layer present on the substrate side of the light absorptive layer, $n_{abs}$ is the real part of the complex refractive index of the light absorptive layer, and $\lambda$ is the wavelength of a laser beam.

15 Claims, 5 Drawing Sheets

ΔP.P.: CHANGE IN THE PUSH-PULL BETWEEN BEFORE AND AFTER RECORDING
ΔLd: CHANGE IN THE OPTICAL DISTANCE BETWEEN BEFORE AND AFTER RECORDING

FIGURE 6

Pb: PUSH-PULL LEVEL BEFORE RECORDING
Pr: PUSH-PULL LEVEL DURING RECORDING
Pa: PUSH-PULL LEVEL AFTER RECORDING

FIGURE 7

Pb: PUSH-PULL LEVEL BEFORE RECORDING
Pr: PUSH-PULL LEVEL DURING RECORDING
Pa: PUSH-PULL LEVEL AFTER RECORDING

OPTICAL INFORMATION RECORDING MEDIUM AND RECORDING METHOD

The present invention relates to an optical information recording medium and a method for recording information on such an optical information recording medium. More particularly, it relates to an optical information recording medium capable of being optically written in or read out, which comprises a light transmitting substrate having a pregroove formed on its surface, a light absorptive layer of a coloring matter formed on the substrate and a light reflective layer made of a metal film formed on the light absorptive layer, and a method for recording information on such an optical information recording medium.

As optical information recording media of this type, compact disks (hereinafter referred to simply as "CD") have been practically developed and widely used as optical information recording media of ROM (read only memory) type wherein pits are already formed on a light transmitting substrate by means of e.g. a press and a reflective layer of a metal is formed on the surface having such pits.

As a further progress from such a ROM type, optical information recording media have been proposed on which information can be recorded by irradiating a laser beam to the substrate as the user requires.

For example, Japanese Unexamined Patent Publication No. 89605/1979 discloses an optical information recording medium which comprises at least a transparent substrate, a light absorptive layer containing a coloring matter formed on the substrate and a light reflective layer formed on the light absorptive layer, and on which information can optically be recorded and from which the recorded information can be optically reproduced.

Further, Japanese Unexamined Patent Publication No. 189851/1983 or No. 171689/1984 discloses a recording method to such an optical information recording medium by deforming a layer adjacent to the light absorptive layer.

Japanese Unexamined Patent Publication No. 135640/1984 or No. 210546/1984 proposes to flatten (hereinafter referred to as "leveling") the light reflective layer side of a light absorptive layer formed on a substrate having a pregroove, to improve the contrast of read-out signals obtained from an optical information recording medium.

Still further, Japanese Unexamined Patent Publication No. 257931/1988 discloses an optical information recording medium having prepits, wherein the depth of the prepits is defined.

However, such conventional optical recording media of recordable or writable type using coloring matters in their light absorptive layers, have a problem that they require new CD players useful exclusively for the reproduction of the signals recorded on such optical information recording media, and the information recorded in such optical information recording media can not be reproduced by commonly and widely commercially available CD players for compact disks of ROM type.

To conduct the reproduction by commercially available CD players, optical recording media must be able to produce read-out signals which satisfy the CD standards which are accepted world widely.

To satisfy the CD standards, it is required that the reflectance is at least 70%; with respect to the degree of modulation of the read-out signals, $I_{11}/I_{top}$ is at least 0.6, and $I_3/I_{top}$ is from 0.3 to 0.7; the block error rate is at most $3.0 \times 10^{-2}$; and further when a push-pull method is employed for tracking pits, the push-pull value is from 0.04 to 0.07.

This push-pull value will be explained. A so-called writable CD is expected to be capable of not only reproducing but also recording information so that read-out signals satisfying the above CD standards can be obtained. Accordingly, in order to record information so that signals satisfying the CD standards can be reproduced, it is necessary to ensure accurate tracking even when the CD is still in a non-recorded state.

A three beam method or a push-pull method is generally known as a so-called tracking method for accurately positioning the laser pick up so that its irradiation position is in alignment with the pit line on the CD, and the recording and reproducing laser beams can accurately follow the track of the CD.

According to this push-pull method, a photodetector is designed to detect lights reflected from the right and left sections along the track, and the laser pick up is accurately guided on the track by comparing the quantities of the lights reflected from the two sections. Such a tracking method can be employed not only for an optical information recording medium already recorded, but also for an optical information recording medium in a non-recorded state.

Similar to the CD standards (see IEC 908), such a push-pull value is represented by $(I_1 - I_2)/I_0$, wherein $I_0$ is the optical power intensity of the beam reflected from the track, and $I_1 - I_2$ denotes the optical power difference in the two halves of the reflected beam measured at far field.

The current CD standards prescribe a push-pull value in an already recorded state. According to this CD standards, the push-pull value is required to be within a range of from 0.04 to 0.07 at 0.1 $\mu$m radial offset, as mentioned above.

However, in order to record information so that read-out signals satisfying the CD standards can be obtained, a push-pull value for recording is also necessary. The push-pull values before and after the recording should preferably be as close as possible to each other.

However, none of the conventional optical information recording media comprising a substrate having a pregroove, a light absorptive layer containing a coloring matter formed on the substrate and a light reflective layer formed on this light absorptive layer, has a standard relating to such a push-pull value, or indicates the optimum conditions for the substrate and the light absorptive layer satisfying the various conditions prescribed by the above-mentioned CD standards.

The present invention has been made in view of the above problems. It is an object of the present invention to provide an optical information recording medium whereby read-out signals prescribed in the CD standards can readily be obtained and a method for optically recording information to such an optical information recording medium.

Specifically, it is a first object of the present invention to provide an optical recording medium whereby stable tracking is possible during the recording as well as during the reproduction, and the push-pull value satisfies the CD standards.

It is a second object of the present invention to provide an optical recording medium whereby the reflectance and the degree of modulation during the reproduction satisfy the CD standards.

A third object of the present invention is to provide a method for optically recording information to such an optical information recording medium to satisfy the above objects.

According to the first aspect, the present invention provides an optical information recording medium comprising a light transmitting substrate having a spiral pregroove formed on its surface, a light absorptive layer of a coloring matter formed on the substrate directly or with other layer interposed therebetween, and a light reflective layer made of a metal film formed on the light absorptive layer directly or with other layer interposed therebetween, wherein $\Delta S < 0.3$ wherein $\Delta S$ is the optical phase difference represented by $\Delta S = 2d_{sub}\{n_{sub} - n_{abs}(1 - d_{abs}/d_{sub})\}/\lambda$ wherein $d_{sub}$ is the depth of the layer boundary on the substrate side of the light absorptive layer at the portion corresponding to the pregroove, $d_{abs}$ is the depth of the layer boundary on the light absorptive layer side of the light reflective layer at the portion corresponding to the pregroove, $n_{sub}$ is the real part of the complex refractive index of the substrate and any layer present on the substrate side of the light absorptive layer $n_{abs}$ is the real part of the complex refractive index of the light absorptive layer, and $\lambda$ is the wavelength of a laser beam. Preferably, $d_{sub}$ is $d_{sub} \geq 50$ nm. Such an optical information recording medium may have a ROM area wherein pits for readout signals are already formed, at the region where the light absorptive layer is absent. The recording on such a medium is conducted by irradiating a recording laser beam from the light transmitting substrate side to deform a layer on the substrate side of the light absorptive layer.

According to the second aspect, the present invention provides an optical information recording medium comprising a light transmitting substrate having a pregroove formed on its surface, a light absorptive layer of a coloring matter formed on the substrate, and a light reflective layer made of a metal film formed on the light absorptive layer, wherein $0.03 \leq \Delta S < \leq 0.3$ wherein $\Delta S$ is the optical phase difference between the reading laser beam reflected from the light reflective layer at the portion corresponding to the pregroove and the reading laser beam reflected from the light reflective layer at the portion corresponding to the land located on each side of the pregroove, represented by $\Delta S = 2d_{sub}\{n_{sub} - n_{abs}(1 - d_{abs}/d_{sub})\}/\lambda$ wherein $d_{sub}$ is the depth of the layer boundary on the substrate side of the light absorptive layer at the portion corresponding to the pregroove, $d_{abs}$ is the depth of the layer boundary on the light absorptive layer side of the light reflective layer at the portion corresponding to the pregroove, $n_{sub}$ is the real part of the complex refractive index of the substrate and any layer present on the substrate side of the light absorptive layer, $n_{abs}$ is the real part of the complex refractive index of the light absorptive layer, and $\lambda$ is the wavelength of a laser beam; and 90 nm $< d_{gr} \leq 350$ nm wherein $d_{gr}$ is the thickness of the light absorptive layer at the portion corresponding to the pregroove. Preferably, $d_{sub}$ is $d_{sub} \geq 40$ nm. It is also preferred that the optical parameter p is $0.05 \leq \rho \leq 1.6$, wherein $\rho = n_{abs} \cdot d_{av}/\lambda$ wherein $d_{av}$ is the average thickness of the light absorptive layer. Further, it is preferred that the imaginary part $k_{abs}$ of the complex refractive index of the light absorptive layer is $k_{abs} \leq 0.3$. A method for recording information on such an optical recording medium comprises forming pits in the pregroove of the optical information recording medium by irradiating a recording laser beam from the substrate side. By this irradiation, the light absorptive layer side of the substrate is deformed.

According to the third aspect, the present invention provides an optical information recording medium comprising a light transmitting substrate having a pregroove formed on its surface, a light absorptive layer of a coloring matter formed on the substrate, and a light reflective layer made of a metal film formed on the light absorptive layer, wherein $-0.4 \leq \Delta S \leq -0.04$ wherein $\Delta S$ is the optical phase difference between the reading laser beam reflected from the light reflective layer at the portion corresponding to the pregroove and the reading laser beam reflected from the light reflective layer at the portion corresponding to the land located on each side Of the pregroove, represented by $\Delta S = 2d_{sub}\{n_{sub} - n_{abs}(1 - d_{abs}/d_{sub})\}/\lambda$ wherein $d_{sub}$ is the depth of the layer boundary on the substrate side of the light absorptive layer at the portion corresponding to the pregroove, $d_{abs}$ is the depth of the layer boundary on the light absorptive layer side of the light reflective layer at the portion corresponding to the pregroove, $n_{sub}$ is the real part of the complex refractive index of the substrate and any layer present on the substrate side of the light absorptive layer, $n_{abs}$ is the real part of the complex refractive index of the light absorptive layer, and $\lambda$ is the wavelength of a laser beam; and 90 nm $\leq d_{1n} \leq 350$ nm wherein $d_{1n}$ is the thickness of the light absorptive layer at the portion corresponding to the land. Preferably, $d_{sub}$ is $d_{sub} \geq 40$ nm. It is preferred that the optical parameter $\rho$ is $0.05 \leq \rho \leq 1.6$ wherein $\rho = n_{abs} \cdot d_{av}/\lambda$ wherein $d_{av}$ is the average thickness of the light absorptive layer. It is also preferred that the imaginary part $k_{abs}$ of the complex refractive index of the light absorptive layer is $k_{abs} \leq 0.3$. A method for recording information on such an optical recording medium comprises forming pits on the land of the optical information recording medium by irradiating a recording laser beam from the substrate side. By such irradiation, the light absorptive layer side of the substrate will be deformed.

Now, the present invention will be described in detail with reference to FIGS. 1 to 9.

Figure 1:
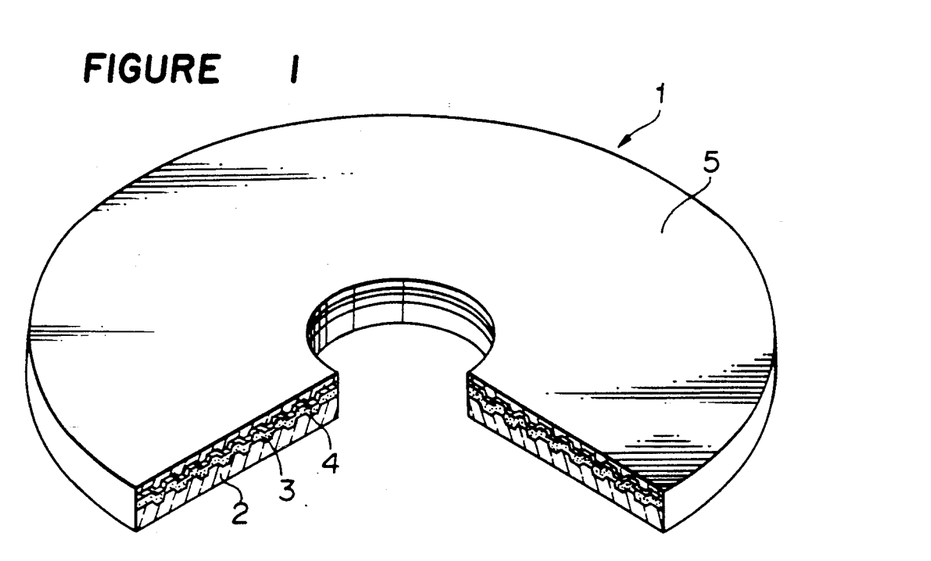
FIG. 1 is a partially cross sectional perspective view of an optical information recording medium 1 of the present invention.
Figure 2:
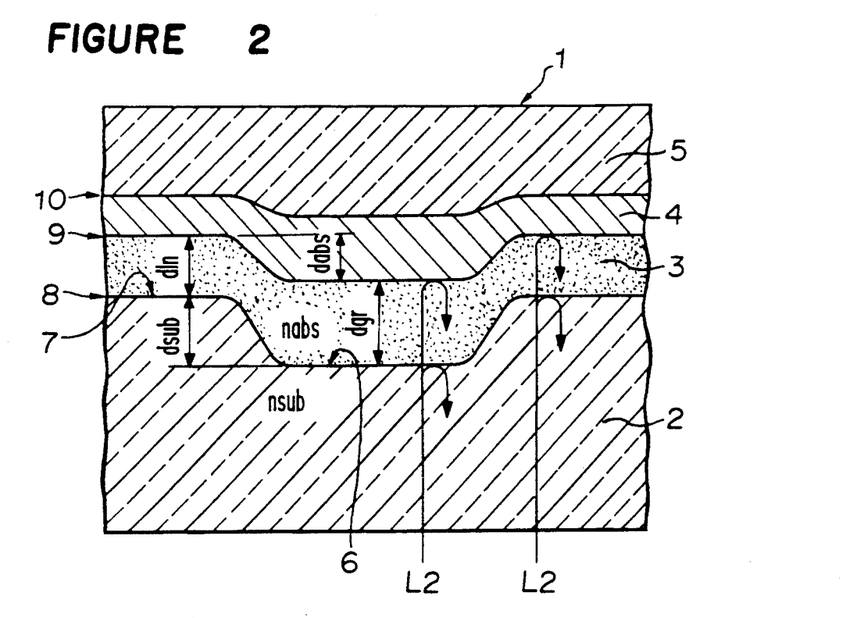
FIG. 2 is a vertical cross sectional view of the main part of the optical information recording medium 1 for describing the medium and the method for optically recording information on such optical information recording medium 1.
Figure 3:
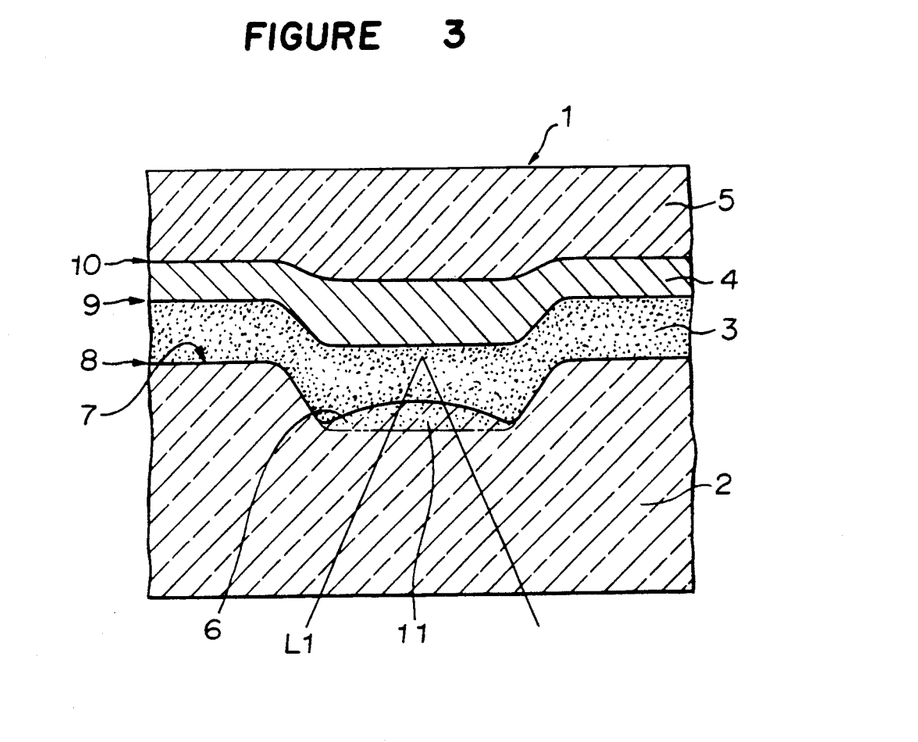
FIG. 3 is a vertical cross sectional view of the main part in such a state that a pit is formed in the pregroove 6.

FIG. 1 is a partially cross sectional perspective view of an optical information recording medium 1 of the present invention, FIG. 2 is a vertical cross sectional view of the main part of the same optical information recording medium 1 before recording, and FIG. 3 is a vertical cross sectional view of the main part of the same optical information recording medium 1 after recording.

This optical information recording medium 1 comprises a transparent substrate 2, a light absorptive layer 3 formed on this substrate 2, a light reflective layer 4 formed on this light absorptive layer 3 and a protective layer 5 formed on this light reflective layer 4. Further, an intermediate layer (not shown) may be provided between the substrate 2 and the light absorptive layer 3 or between the light absorptive layer 3 and the light reflective layer 4, as the case requires.

On the substrate 2, a pregroove 6 is formed in a spiral-shape. On each side of this pregroove 6, a land 7 i.e. a portion other than the pregroove 6, is present.

The substrate 2 and the light absorptive layer 3 are in contact with each other along the first layer boundary 8. Likewise, the light absorptive layer 3 and the light reflective layer 4 are in contact with each other along the second layer boundary 9. The light reflective layer 4 and the protective layer 5 are in contact with each other along the third layer boundary 10.

As shown in FIG. 3, when a recording beam (a recording laser beam) L1 is irradiated to the optical information recording medium 1, the light absorptive layer 3 absorbs the energy of this laser beam L1 and generates heat, whereby heat deformation takes place on the substrate 2 side to form a pit 11. In some cases, an optical change takes place in the light absorptive layer 3. As clearly shown in FIG. 2, the depth from the first layer boundary 8 at the portion corresponding to the land 7 located on each side of the pregroove 6 to the deepest bottom portion of the same first layer boundary 8 at the portion corresponding to the pregroove 6 is designated as $d_{sub}$.

Likewise, the depth from the second layer boundary 9 at the portion corresponding to the land 7 to the deepest bottom portion of the same second layer boundary 9 at the portion corresponding to the pregroove, is designated as $d_{abs}$.

The real part of the complex refractive index of the above substrate 2 and any layer located on the substrate 2 side of the first layer boundary 8 is designated as $n_{sub}$. Namely, when the light absorptive layer 3 is formed directly on the substrate 2 as illustrated in FIG. 2, $n_{sub}$ is the real part of the complex refractive index of the substrate 2. When any layer located on the substrate side of the first layer boundary 8 exists, $n_{sub}$ is the real part of the composite complex refractive index of the substrate 2 and such layer.

The real part of the complex refractive index of the light absorptive layer 3 is designated as $n_{abs}$.

The average thickness of the light absorptive layer 3 is designated as $d_{av}$. Here, the average thickness $d_{av}$ is represented by (volume of the light absorptive layer 3)/(area of the region where the light absorptive layer 3 is formed).

The thickness of the light absorptive layer 3 at the portion corresponding to the pregroove 6 is designated as $d_{gr}$.

The thickness of the light absorptive layer 3 at the portion corresponding to the land 7 is designated as $d_{ln}$.

The imaginary part of the complex refractive index of the light absorptive layer 3 is designated as $k_{abs}$.

The wavelength of the reading beam (reading laser beam) L2 is designated as $\lambda$.

Further, the optical phase difference of this reading laser beam L2 reflected from the light reflective layer 4 between the portion corresponding to the pregroove 6 and the portion corresponding to the land 7, is designated as $\Delta S$. Now, this optical phase difference $\Delta S$ will be described.

Firstly, when a laser beam is irradiated from the substrate 2 side, the optical distance to the second layer boundary 9 at the portion corresponding to the land 7 is represented by:

$$n_{sub} \cdot d_{sub} + n_{abs} \cdot d_{ln}$$

when the first layer boundary 8 on the substrate side of the light absorptive layer 3 in the pregroove 6 is regarded as the reference.

Likewise, the optical distance to the second layer boundary 9 at the portion corresponding to the pregroove 6 is represented by:

$$n_{abs} \cdot d_{gr}$$

when the first layer boundary 8 on the substrate 2 side of the light absorptive layer 3 in the pregroove 6 is regarded as the reference.

Accordingly, the difference ND of the optical distances is represented as follows:

$$\begin{aligned} ND &= (n_{sub} \cdot d_{sub} + n_{abs} \cdot d_{ln}) - n_{abs} \cdot d_{gr} \\ &= n_{sub} \cdot d_{sub} - n_{abs}(d_{gr} - d_{ln}) \end{aligned}$$

where $d_{gr} + d_{abs} = d_{ln} + d_{sub}$.

Namely, $d_{gr} - d_{ln} = d_{sub} - d_{abs}$.

Accordingly, $ND = n_{sub} \cdot d_{sub} - n_{abs}(d_{sub} - d_{abs})$.

Accordingly, when the reading beam L2 is irradiated from the substrate 2 side, the optical phase difference $\Delta S = 2ND/\lambda$ of the reading beam L2 reflected by the light reflective layer 4 between the pregroove 6 portion and the land 7 portion is represented by:

$$2d_{sub}\{n_{sub} - n_{abs}(1 - d_{abs}/d_{sub})\}/\lambda.$$

Figure 4:
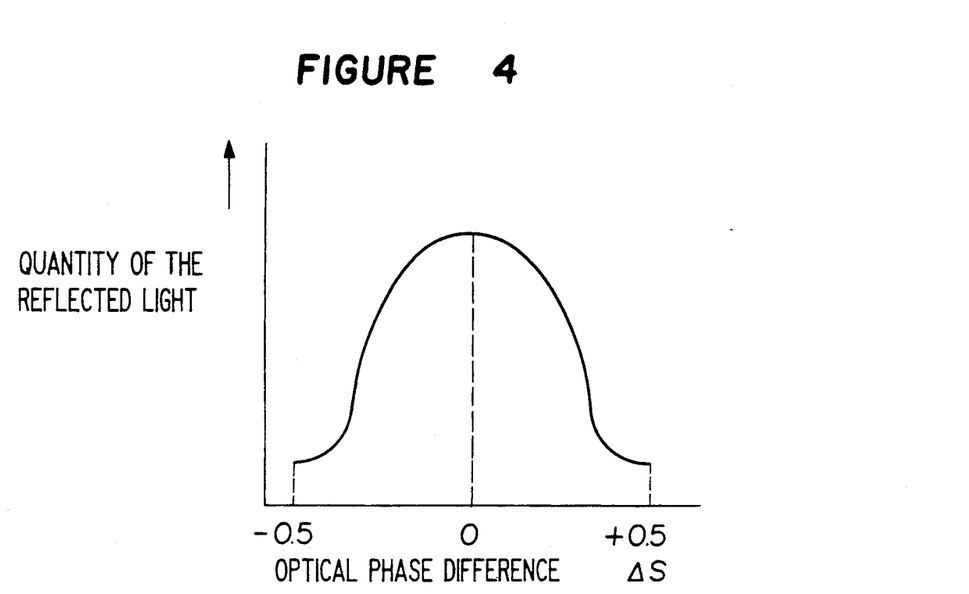
FIG. 4 is a graph showing the relation between the optical phase difference $\Delta S$ and the quantity of the reflected light.

As shown in FIG. 4, when $\Delta S$ is changed within a range of $-0.5 \leq \Delta S \leq 0.5$, the reflected light becomes maximum at $\Delta S = 0$ by the interference effect and becomes minimum at $\Delta S = \pm 0.5$.

The present inventors have found it possible to obtain read-out signals satisfying the CD standards within a range of $\Delta S \leq 0.3$ from the results of experiments and simulation.

Further, from the viewpoint of the practical requirements such as the uniformity of the coating layer and the moldability of the substrate 2, the optical phase difference is preferably $-0.4 \leq \Delta S \leq 0.3$.

Here, the tracking error signal i.e. the push-pull signal depends particularly on this optical phase difference ΔS.

For example, when ΔS is a positive number (ΔS>0), the optical distance at the land 7 portion is long as compared with the pregroove 6.

Figure 5:
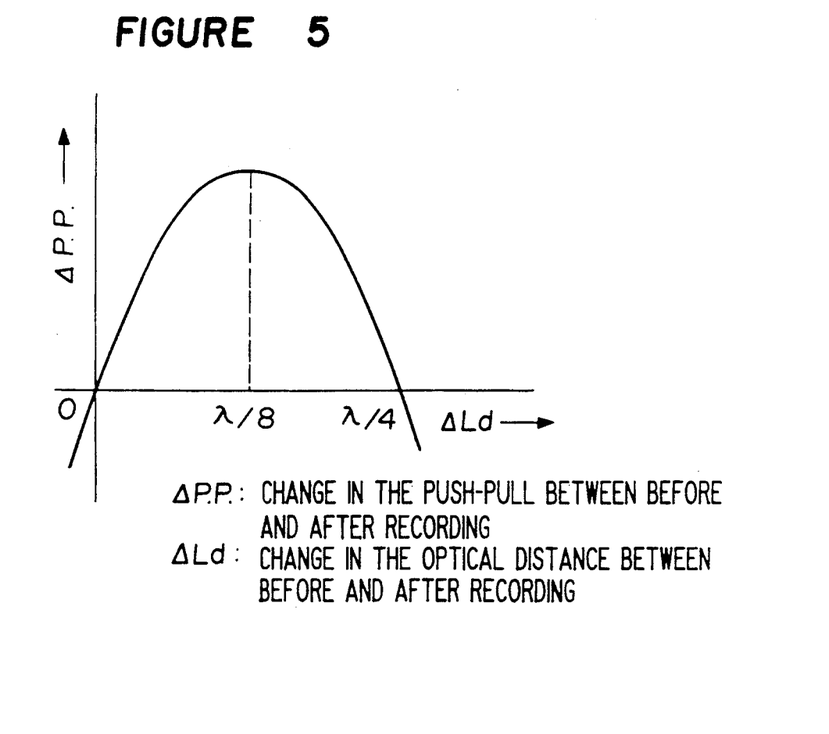
FIG. 5 is a graph showing the relation between $\Delta Ld$ (the change in the optical distance between before and after the recording) and $\Delta P.P.$ (the change in the push-pull value between before and after the recording).

In the recording method involving deformation of the substrate 2 at the first layer boundary 8 between the substrate 2 and the light absorptive layer 3, the surface of the layer on the substrate 2 side of the light absorptive layer 3 deforms in correspondence with the deformation of this substrate 2, whereby the optical distance of the recorded portion corresponding to the pit 11 becomes short. Accordingly, as shown in FIG. 5, when the change 66 Ld in the optical distance between before and after recording (the optical distance being represented by a product of the refractive index and the thickness of the light absorptive layer at the recorded portion) is λ/4, i.e. when the change in the length of the light path between before and after recording is λ/2, there will be no change in the push-pull value between before and after recording (the change ΔP.P. in the push-pull). Whereas, when the change ΔLd is less than λ/4, the push-pull value at the recorded portion tends to be large.

Figure 6:
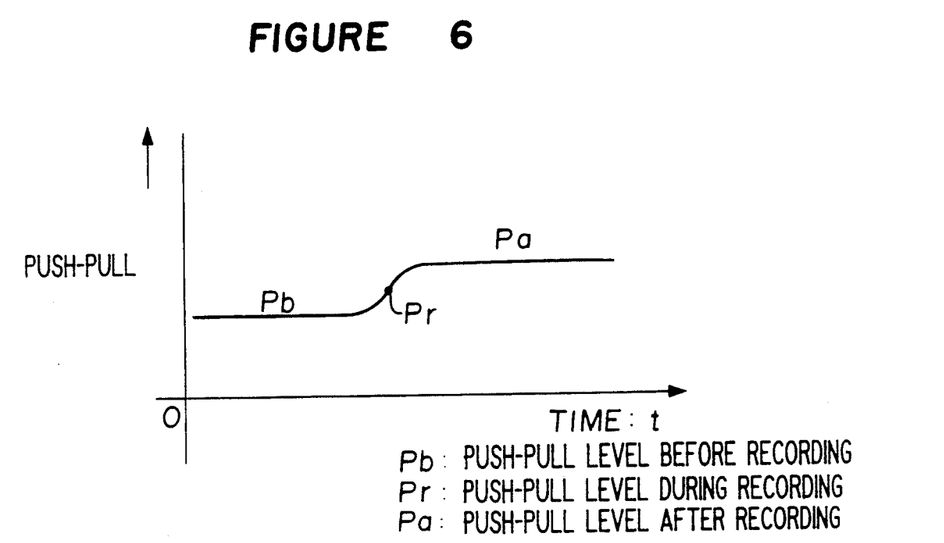
FIG. 6 is a graph showing the change of the push-pull over the period covering before and after the recording.

In such a case, if recording is made in the pregroove 6, the push-pull during the recording is always positive i.e. the phase is not reversed in the case as shown in FIG. 6, whereby tracking can adequately be conducted.

Accordingly, when ΔS>0, it is preferred to conduct the recording in the pregroove, whereby recording and reproduction can be conducted smoothly with a minimum variation in the push-pull as between the pit portion and the non-pit portion and without inversion of the phase of the push-pull between the portion of pit 11 and the non-pit portion.

Figure 7:
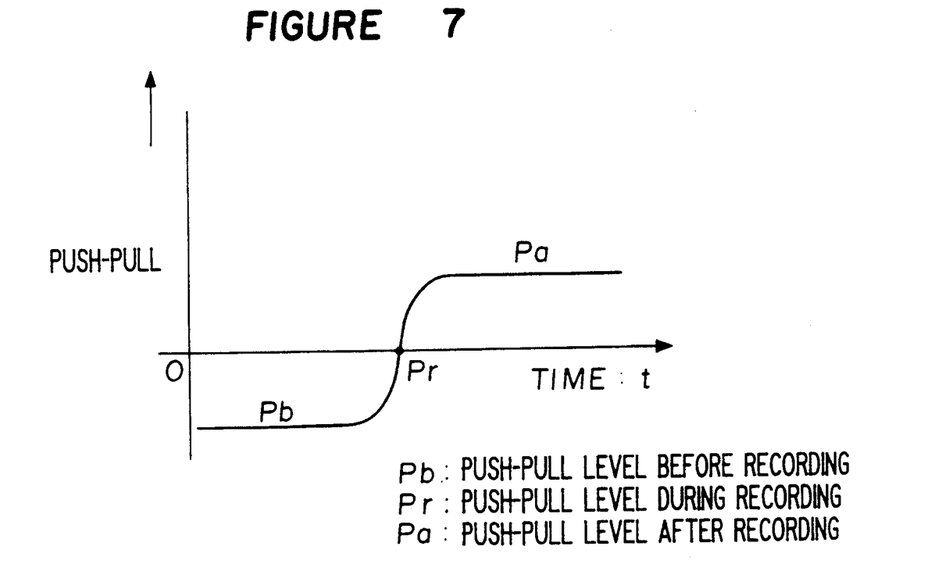
FIG. 7 is a graph showing the change in the push-pull over the period covering before and after the recording, in a case where the push-pull is reversed from negative to positive.

If recording is made on the land 7 portion when ΔS>0, it is likely that the push-pull level becomes 0 during the recording, as shown in FIG. 7. If the push-pull level becomes 0, tracking during the recording will be unstable, thus leading to mistracking or jitter.

As a result of the study, the present inventors have found it possible to present an optical information recording medium 1 capable of tracking on the pregroove 6 under a stabilized condition by adjusting the optical phase difference ΔS to a level within a range of from 0.03 to 0.3. If ΔS is less than 0.03, the push-pull at the recorded portion tends to be too small to conduct tracking under a stabilized condition. On the other hand, if ΔS is larger than 0.3, the reflectance at the recorded portion will be small, whereby it becomes difficult to satisfy the reflectance of at least 70% as prescribed in the CD standards.

In the case where ΔS<0, the optical distance of the pregroove 6 portion is long as compared with the land 7 portion. As mentioned above with respect to the case where ΔS>0, in the recording method involving deformation of the substrate 2 at the first layer boundary 8 between the substrate 2 and the light absorptive layer 3, the surface of the layer on the substrate 2 side of the light absorptive layer 3 deforms in correspondence with the deformation of the substrate 2, whereby the optical distance of the recorded portion corresponding to the pit 11 becomes short. Accordingly, as shown in FIG. 5, in the case where the change ΔLd in the optical distance is λ/4 (difference in the light path: λ/2), there will be no difference in the push-pull between the recorded portion and the non-recorded portion (the change ΔP.P. in the push-pull). Whereas in the case where the change ΔLd is less than λ/4, the push-pull at the recorded portion tends to be large.

If recording is made on the land 7 in such a case, the push-pull during the recording is always positive i.e. the phase is not inverted as shown in FIG. 6, whereby tracking can satisfactorily be conducted.

Accordingly, when ΔS<0, it is preferred that the recording is conducted on the land 7, whereby recording and reproduction can be conducted under a stabilized condition with a minimum variation in the push-pull as between the pit portion and the non-pit portion and without inversion of the phase between the pit 11 portion and the non-pit portion.

Further, if recording is conducted on the pregroove 6 portion when ΔS<0, the push-pull is likely to be 0 during the recording as shown in FIG. 7. If the push-pull becomes 0, tracking during the recording will be unstable, thus leading to mistracking or jitter.

As a result of the study, the present inventors have found it possible to present an optical information recording medium 1 capable of tracking under a stabilized condition by adjusting the optical phase difference ΔS to a level within a range of from −0.04 to −0.4. If ΔS is larger than −0.04, the push-pull at the recorded portion will be too small, whereby tracking will be difficult. On the other hand, if this ΔS is smaller than −0.4, the reflectance at the recorded portion will be small, and it will be difficult to satisfy the reflectance of at least 70% as prescribed in the CD standards.

Now, the depth $d_{sub}$ at the portion corresponding to the pregroove 6 will be described. By adjusting this $d_{sub}$ to a level of at least 40 nm, preferably at least 60 nm, it is possible to obtain an optical information recording medium 1 having a high degree of modulation and little jitter or wave shape distortion, which thus satisfies the CD standards for read-out signals.

Now, the thickness $d_{gr}$ at the portion corresponding to the pregroove 6 will be described.

In a case where recording is conducted in the pregroove 6 when the optical phase difference is ΔS>0, recording can be conducted under good condition with little wave shape distortion or jitter, when the thickness $d_{gr}$ at the pregroove 6 portion is from 90 to 350 nm.

Especially when $d_{gr}$ is from 150 to 300 nm, recording can be conducted under the optimum condition with a high degree of modulation and no substantial change in the push-pull as between before and after the recording. If $d_{gr}$ is smaller than 90 nm, the optical phase difference between the recorded portion and the non-recorded portion tends to be too small to obtain adequate degree of modulation. On the other hand, if $d_{gr}$ exceeds 350 nm, jitter and waveform distortion will be substantial, and it becomes difficult to satisfy the CD standards with respect to the block error rate (BLER).

Now, the thickness $d_{1n}$ at the portion corresponding to the land 7 will be described.

In a case where recording is conducted on the land 7 when the optical phase difference is ΔS<0, excellent recording can be conducted with little wave shape distortion or jitter when the thickness $d_{1n}$ at the land 7 portion is from 90 to 350 nm.

Especially when $d_{1n}$ is within a range of from 180 to 350 nm, recording can be conducted under an optimum condition with a large degree of modulation and no substantial change in the push-pull between before and after the recording. If $d_{1n}$ is smaller than 90 nm, the optical phase difference between the recorded portion and the non-recorded portion, or between before and after the recording, tends to be too small to obtain adequate modulation. On the other hand, if $d_{1n}$ is larger 350 nm, jitter and wave shape distortion will be substantial, whereby it becomes difficult to satisfy the CD standards with respect to the block error rate (BLER).

In the foregoing, the invention has been described with reference to an embodiment wherein a single light absorptive layer is employed. However, the same description is applicable also to a case wherein a plurality of light absorptive layers exist, or an additional layer exists adjacent to the light absorptive layer.

Further, the positive and negative symbols for push-pull used in the foregoing description, may be inverted depending upon the positive or negative setting of the player. Even when the symbol is inverted, the same description is applicable so long as there is no change in the symbol for push-pull between before and after recording.

Now, the optical parameter defined by $\rho = n_{abs} \cdot d_{av}/\lambda$ will be described.

From the results of the experiments and simulation by the present inventors, it has been found that $\rho = n_{abs} \cdot d_{av}/\lambda$ is a very important parameter. Namely, with an optical information recording medium 1 having a structure such that a light absorptive layer 3 and a light reflective layer 4 are formed on a substrate 2, it is important that $\rho = n_{abs} \cdot d_{av}/\lambda$ wherein $n_{abs}$ is the real part of the complex refractive index of the light absorptive layer 3, $d_{av}$ is the average thickness of the thickness $d_{gr}$ of the pregroove 6 portion and the thickness $d_{1n}$ of the land 7 portion and $\lambda$ is the wavelength of the reading laser beam, is set within a range of $0.05 \leq \rho \leq 1.6$ to attain a reflectance of at least 70% and output signals with a degree of modulation $I_{11}/I_{top}$ of at least 60% and a degree of modulation $I_3/I_{top}$ of from 0.3 to 0.7, as prescribed in the CD standards. By adjusting the optical parameter $\rho$ within the above range, the reflectance can be easily made to be at least 70% as prescribed in the CD standards.

If $\rho$ is smaller than 0.05, the thickness $d_{av}$ of the light absorptive layer 3 will have to be made as thin as 0.05 μm or less, such being not practical from the viewpoint of the production. Accordingly, within the range of $0.05 \leq \rho \leq 0.6$, a range of $0.30 \leq \rho \leq 0.6$ is practical. In order to secure an adequate degree of modulation, the optical parameter $\rho$ is preferably at least 0.1. In order to obtain stabilized recording properties with a high degree of modulation, a range of from $0.45 \pm 0.1$ is most preferred.

Figure 8:
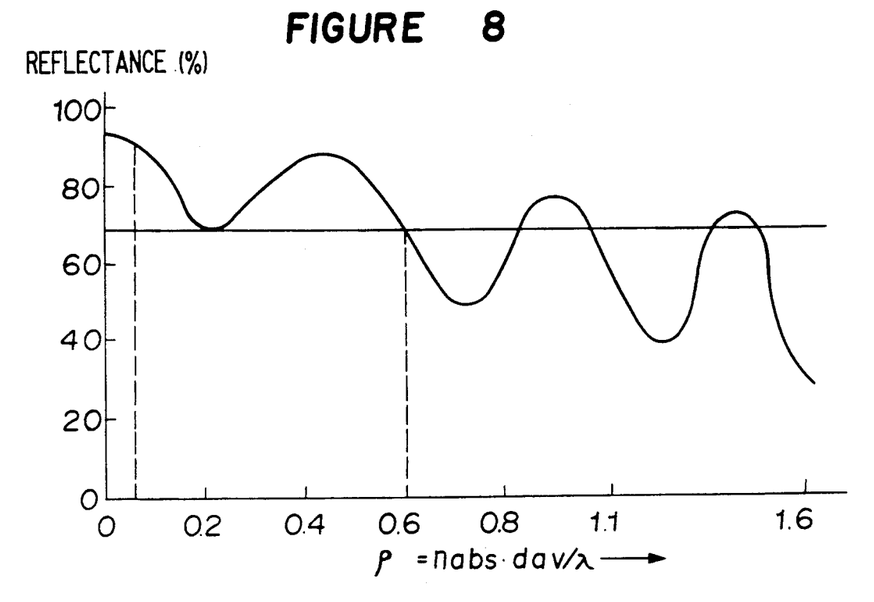
FIG. 8 is a graph showing the relation between $\rho$ ($=n_{abs} \cdot d_{av}/\lambda$) and the reflectance.

Further, as shown in FIG. 8, even if p is higher than 0.6, if it is at the peaks on the graph of FIG. 8, it is possible that the reflectance exceeds 70%.

Within a range of from $0.6 < \rho < 1.6$, there are two peaks which always exist within the ranges of $0.6 < \rho < 1.10$ and $1.10 < \rho < 1.6$. At such peaks, a high reflectance can be obtained. If $\rho > 1.6$, the thickness of the layer is so thick that it becomes difficult to control the thickness, such being not practical from the viewpoint of production.

The graph showing this relation between $\rho$ and the reflectance, can be represented by a function which is a combination of an exponential function and a periodic function, whereby the amplitude of the periodic function increases as the value $\rho$ increases.

The amplitude of this periodic function varies depending upon parameters such as the complex refractive indices of the layers constituting the optical information recording medium, their thicknesses and the uniformity thereof. For example, if the refractive index of a layer located on the incident light side of the light absorptive layer 3 is small, the reflectance shifts to a higher side in the graph.

Figure 9:
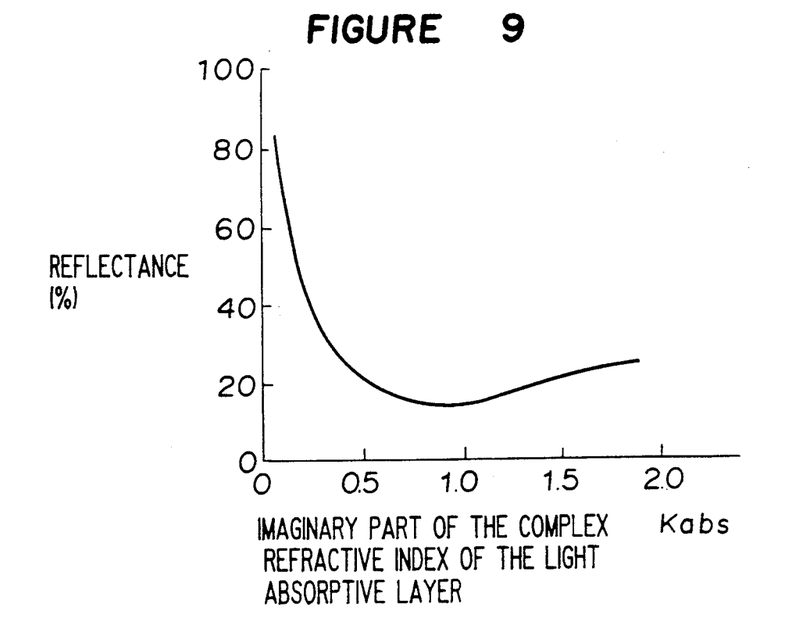
FIG. 9 is a graph showing the relation between the imaginary part $k_{abs}$ of the complex refractive index of the light absorptive layer 3 and the reflectance.

Further, this graph can be represented by an exponential function having the imaginary part $k_{abs}$ of the complex refractive index of the light absorptive layer 3 and $d_{av}$ as parameters. As shown in FIG. 9, it has been found that the overall decrement of the reflectance in the graph increases as $k_{abs}$ increases.

From the simulation prepared by the present inventors, it has been found that so long as the light absorptive layer 3 is homogeneous and there is no non-uniform distribution in the real part $n_{abs}$ of the complex refractive index and in the average thickness $d_{av}$, there will be no variation in the periodic cycle of the peaks in the graph.

Under certain conditions, it is also possible to increase the reflectance at the bottoms of the graph in FIG. 8 by controlling the above-mentioned parameters. However, when the optical parameter $\rho$ is set in the vicinity of the bottoms, it becomes difficult to increase the degree of modulation and in some cases, the reflectance is likely to increase beyond the level prior to the recording. Thus, the optical parameter $\rho$ is preferably set in the vicinity of the peaks.

Now, $k_{abs}$ will be explained.

In order to obtain a high reflectance, this $k_{abs}$ is required to be at most 0.3.

The present inventors have found that the numerical value of $k_{abs}$ is an important parameter. Namely, when this $k_{abs}$ is at most 0.3, the closer the value $k_{abs}$ to 0, the higher the reflectance. Therefore, this range is most preferred. However, if the value is too close to 0, the recording sensitivity will be poor. Therefore, it is required to be larger than 0. Specifically, it is preferably at least 0.01. Practically, it is preferably about 0.05.

When the optical parameter $\rho$ is within a range of from 0.05 to 0.6, the imaginary part $k_{abs}$ of the complex refractive index of the same layer is preferably at most 0.3. When $\rho$ is within a range of from 0.6 to 1.6, $k_{abs}$ is preferably at most 0.2.

Such definitions of the present invention are applicable even when other layers are provided. For example, in a case where a transparent layer such as an enhancing layer of e.g. $SiO_2$ or a primer layer, is provided between the substrate 2 and the light absorptive layer 3, such a transparent layer may be taken as a part of the substrate 2, and in a case where a layer such as an adhesive layer or a hard layer, is provided between the light absorptive layer 3 and the light reflective layer 4, such an additional layer may be taken as a second light absorptive layer 3, and the optical parameter $\rho$ will be $\rho = (n_1 \cdot d_1 + n_2 \cdot d_2)/\lambda$. In a case of a plurality of layers, the optical parameter $\rho$ will be $\rho = \Sigma(n_i \cdot d_i)/\lambda$ where i is an integer and $n_i$ is the real part of the complex refractive index of each layer, and $d_i$ is the average thickness of each layer. In this manner, even the case involving a plurality of layers, can be dealt with in the same way.

Likewise, a composite complex refractive index K representing the average of a plurality of $k_{abs}$, can be obtained by $K = \Sigma d_i \cdot k_i / \Sigma d_i$ where $k_i$ is the imaginary part of the complex refractive index of each layer, and thus this case can be dealt with in the same manner as in the case of a single layer.

Now, the materials and physical properties of the respective layers will be described. Firstly, the light transmitting substrate 2 is made of a material having high transparency with a refractive index within a range of from 1.4 to 1.6 to laser beams and is usually made of a resin having excellent impact strength. For example, a glass plate, an acrylate resin plate or an epoxy resin plate can be employed. Further, other layers such as a solvent resistant layer of e.g. $SiO_2$ and an enhancing layer, may be formed on the substrate 2.

Such a material is molded by a method such as an injection molding method. The thickness of the substrate 2 is preferably from 1.1 to 1.5 mm to satisfy the CD standards. To obtain adequate effects of the present invention, polycarbonate is preferred as the material for the substrate 2. Further, the thermal expansion coefficient u of the substrate 2 is preferably at a level of from $5.0 \times 10^{-5}$ to $7.0 \times 10^{-5}$ cm/° C.

A tracking guide means is a provided on the surface at the absorptive layer 3 side of the substrate 2. Such a tracking guide means may be so-called sample servo i.e. address pits composed of pits formed at predetermined intervals. However, a pregroove 6 formed in a spiral shape (FIGS. 2 and 3) is preferred. The spiral pregroove 6 is used to guide the tracking when data signals are to be recorded.

The depth of the pregroove 6 may be at any level so long as it meets the usual conditions. However, a depth of from 30 to 250 nm is suitable. Preferably, the depth is from 60 to 180 nm. Further, the width of the pregroove 6 is preferably from 0.3 to 1.3 $\mu$m. The distance between one pregroove 6 to another pregroove 6 i.e. a so-called tracking pitch is preferably 1.6 $\mu$m.

Further, as the tracking means such as the pregroove 6, the time code information (ATIP: absolute time in pregroove) may be recorded along the edge of the pregroove 6. Such a pregroove is usually formed by pressing a stamper at the time of the injection molding of the substrate 2. However, it may be formed by cutting with a laser beam or by a 2P method (photo-polymer method).

Next, the light absorptive layer 3 is a layer of a light absorptive material formed on the tracking guide means of the substrate 2. It is a layer which undergoes heat generation, fusion, sublimation, deformation or property change when irradiated with a laser beam. This light absorptive layer 3 is formed by uniformly coating on the surface of the substrate 2 a cyanine dye or the like dissolved in a solvent by a method such as a spin coating method.

As the material for the light absorptive layer 3, any conventional optical information material may be used to obtain the effects of the present invention. However, a light absorptive organic dye is preferred. Specifically, light absorptive organic dyes such as a polymethine dye, a triarylmethane dye, a pyrylium dye, a phenanthrene dye, a tetrahydrocholine dye, a triarylamine dye, a squarylium dye, a croconic methine dye and mellocyanine dye, may be mentioned. However the material of the light absorptive layer is not limited to such examples. The effects of the present invention can be obtained, so long as it is a conventional optical recording material.

Further, the light absorptive layer 3 may contain other dyes, resins (e.g. a thermoplastic resin such as nitrocellulose, or a thermoplastic elastomer), liquid rubber, etc.

Specifically, isobutylene, a maleic anhydride copolymer, an ethylene-vinyl acetate copolymer, chlorinated polypropylene, polyethylene oxide, polyamide, nylon, a cumarone resin, a ketone resin, a vinyl acetate, polystyrene, PVA (polyvinyl alcohol) and PVE (polyvinyl ester) may, for example, be mentioned.

As a cellulose derivative, carboxymethyl cellulose, nitrocellulose, HPC (hydroxypropyl cellulose), HEC (hydroxyethyl cellulose), MC (methyl cellulose), EC (ethyl cellulose), EHEC (ethylhydroxyethyl cellulose) or CMEC (carboxymethylethyl cellulose) may be mentioned.

As an oligomer, oligostyrene or methylstyrene oligomer may be mentioned.

As an elastomer rubber, a styrene block copolymer or a urethane thermoplastic elastomer may be mentioned.

The light absorptive layer 3 is formed by applying the above-mentioned dye and optical additives dissolved in a known organic solvent (such as detone alcohol, acetyl acetone, methyl cellosolve or toluene), on the surface of the substrate 2 having the pregroove 6, or on the surface of other layer formed on the substrate 2.

For such application, a vapor deposition method, a LB method or a spin coating method is preferred, since the thickness of the light absorptive layer 3 can easily be controlled by adjusting the concentration, viscosity or the drying sped of the solvent.

As a specific method for controlling the thickness of this light absorptive layer 3, a method of changing the rotational speed of the spin coating, a method of conducting spin coating with a mixture of substances having different viscosities, a method of conducting spin coating with a light absorptive layer substance dissolved in a plurality of solvents, or a method of conducting spin coating with a mixture of high boiling point substances, may be mentioned.

Now, the light reflective layer 4 is a metal film. For example, gold, silver, copper, aluminum or an alloy thereof is formed into such a metal film by a method such as a vapor deposition method or a sputtering method. Among them, a metal film composed mainly of gold or an alloy containing gold is preferred, since it is required to have reflectance of at least 70%.

Further, to prevent oxidation of the light reflective layer 4, other layer such as an oxidation resistant layer may be formed on the light reflective layer 4.

The protective layer 5 is formed with a resin excellent in the impact strength similar to the substrate 2. For example, it is formed by coating an ultraviolet curable resin by spin coating, followed by irradiation with ultraviolet rays for curing. As other materials, an epoxy resin, an acrylate resin, a silicone hard coat resin, etc. may be used.

The protective layer 5 is usually formed by coating a monomer or oligomer of an organic compound capable of forming a polymer by polymerization, followed by a cross linking reaction. However, the material is not limited to such an organic compound. For example, an inorganic substance may be applied by a known method such as a sputtering method or a vapor deposition method.

In order to obtain a protective layer of an organic polymer by the cross linking reaction, it is advantageous from the operational point of view to adopt a method wherein a reaction initiator and a reaction catalyst are added in small amounts to a mixture of a monomer and an oligomer of an organic polymerizable compound having at least one reactive acryloyl group ($-CH=CH_2$) per molecule, such a liquid mixture is coated and then cross-linked by irradiation with ultraviolet rays or electron beams.

However, the cross linking method is not limited to such a specific example. For instance, a resin curable by heat such as an epoxy resin or a urethane resin may be employed, or the one curable with moisture in air such as a dialkoxysilane coupling agent may be employed.

The backbone chains and side chains of the cross-linked product thus obtained may be a saturated or unsaturated linear hydrocarbon, or may contain a cyclic compound of e.g. melamine or bisphenol type. Further, the backbone chains or side chains of such a cross-linked product may contain at least one other bond such as an ester bond in the form of a polyester, an urethane bond in the form of a polyurethane, an ion linkage in the form of an ionomer, an amide bond in the form of a polyamide, an imide bond in the form of a polyimide, a sulfone bond in the form of a polysulfone or a sulfide bond in the form of a polysulfide. It may be a copolymer compound containing two or more such bonds, or it may be a block polymer.

Further, these cross-linked products may contain a fluorocarbon in their side chains in order to improve their moisture resistance or may contain epoxy resins to prevent the degradation by a hydrogen halide.

Further, they may contain hydroxyl groups, carboxyl groups, acrylic groups, amino groups or vinyl acetate groups in their side chains in order to improve the adhesion to the light reflective layer 4. The backbone chains or side chains may contain a basic acid.

For the formation of the protective layer 5, the coating solution may contain in addition to the resin, the reactants and the reaction initiator, a solvent or a diluent to improve the coating properties. Further, to stabilize the coated film, a leveling agent, a plasticizer, an antioxidant, an antistatic agent, etc. may be incorporated. Further, if necessary, the coating solution may be colored with a pigment or a dyestuff.

The curing of the resin may be controlled by adjusting the cross linking density of the cross-linked structure or by adjusting the concentration of the reactive acryloyl groups. The curing may also be varied depending upon the degree of freeness of the molecular rotation of the oligomer itself which forms the backbone chain.

In the optical information recording medium 1 of the present invention, a layer behind the light absorptive layer 3 relative to the light transmitting substrate 2, such as the light reflective layer 4 or the protective layer 5, is preferably made of a material having a heat distortion temperature and a hardness higher than the layer on which pits 11 are formed. By forming the layer behind the absorptive layer 3, with a hard material, the block error rate of recorded signals can effectively be reduced.

Within the practical environmental temperature i.e. from $-15°$ C. to $70°$ C. as prescribed in the CD standards, by adjusting the hardness of the protective layer 5 to a level of a pencil hardness of at most 2H, it is possible to control the deformation of the second layer boundary 9 at the light reflective layer 4 side of the light absorptive layer 3. Consequently, the wave-form distortion can be controlled, and excellent recording with a minimum BLER (block error rate) can be attained. BLER tends to increase as the hardness of the protective layer 5 decreases.

By adjusting the thermal expansion coefficient $\alpha$ of the protective layer 5 to a level within a range of from $1.5 \times 10^{-5}$ to $9.0 \times 10^{-5}$ within the practical environmental temperature of from $-15°$ C. to $70°$ C., this protective layer 5 shows a thermal volume change similar to the substrate 2, whereby the optical information recording medium 1 will hardly undergo warping as a whole even when subjected to a heat.

In a case where $\alpha$ is less than $1.5 \times 10^{-5}$, the substrate 2 will expand more by the thermal expansion under heating, and the optical information recording medium 1 will warp to the protective layer 5 side, whereby a tension will be created in each layer on the substrate 2, thus leading to an increase of jitter of the recorded pits 11.

When $\alpha$ is larger than $9.0 \times 10^{-5}$, the protective layer 5 will expand more by thermal expansion under heating, and the protective layer 5 will sag, whereby ply separation will take place between the light absorptive layer 3 and the light reflective layer 4 or between the light reflective layer 4 and the protective layer 5.

When the shrinkage of the protective layer 5 is adjusted to be not higher than 12%, even if it is cured and subjected to a heat cycle test to remove a strain of the resin, no cracking appears on the protective layer 5. In consideration with the mechanical strength, this shrinkage is preferably at most 10%.

Furthermore, an oxidation resistance layer to prevent oxidation of the light reflective layer 4 may be interposed between the light reflective layer 4 and the protective layer 5.

Recording on the optical information recording medium of the present invention can be conducted by a conventional optical information recording apparatus as described below. Namely, the optical information recording medium 1 is disposed so that the surface of the light transmitting substrate 2 faces the laser irradiation means i.e. the pick up side of the optical information recording apparatus. While rotating this optical information recording medium 1 by a spindle motor, a laser spot modulate into a signal prescribed in the CD standards is irradiated to the light absorptive layer 3 of the optical information recording medium 1 by the pick up to form a pit 11, under tracking by means of the above-mentioned tracking guide means.

In the optical information recording method according to the present invention, it is preferred to irradiate a laser spot with a wavelength $\lambda$ of about 780 nm. Further, with respect to the CD standards, the linear speed is required to be at a level of from 1.2 to 1.4 m/sec, and the recording power may be at a level of from 6 to 9 mW. Namely, with a commercially available CD player, recording can be conducted by increasing the recording power to a level higher than the power for play back.

At the time of this recording, when the land 7 portion between the pregrooves 6 is optically bright depending upon the conditions such as the thickness of the light absorptive layer 3, as described above, it is preferred to irradiate the laser beam to form pits 11 in the pregroove 6. When the pregroove 6 is optically bright, it is preferred to form pits 11 on the land 7 portion.

By forming pits 11 under such conditions, the difference in the brightness of the reflected light of the reading laser beam for play back will be distinct, and a high degree of modulation can be obtained.

Thus, it is readily possible to obtain an optical information recording medium 1 capable of providing read-out signals satisfying the CD standards.

The optical information recording medium 1 of the present invention is preferably of the type shown in FIG. 3, wherein when a recording laser beam L1 is irradiated from a substrate 2 side to the light absorptive layer 3, this light absorptive layer 3 absorbs the laser beam L1 and generates heat, whereby the surface of the substrate 2 is locally deformed to form pits 11 on the surface of the substrate 2.

Otherwise it may be of the type wherein the light absorptive layer 3 undergoes an optical change whereby pit 11 will be formed.

Further, there is a case wherein a component fused or decomposed by the irradiation with the above laser beam L1 diffuses into the softened substrate 2 and will be partially mixed and or chemically reacted with the components constituting the substrate 2 to form there a portion which is optically different from other portions of the light absorptive layer 3 or the substrate 2 and which thus constitutes a pit 11.

Reproduction of the recorded signals can be conducted by irradiating a reading laser beam L2 from the substrate 2 side and reading the difference in the brightness due to the optical phase difference $\Delta S$ between the reflected light from the pit 11 portion and the reflected light from the portion other than the pits 11.

Further, the present invention is applicable not only to an optical information recording medium 1 wherein the light absorptive layer 3 is formed substantially over the entire surface of the substrate 2, but also to an optical information recording medium wherein a part of the substrate 2 is a recordable region having the light absorptive layer 3 and the rest of the substrate 2 is a ROM region having pits 11 capable of reproducing CD formatted signals. Such an optical information recording medium may be prepared, for example, by preliminarily forming by e.g. a stamper, pits for read-out signals at the portion corresponding to the ROM region on the surface of the substrate and forming a light absorptive layer 3 only at the outer recordable region.

With such an information recording medium, it is possible to preliminarily record the same data in a large quantity at the ROM region, and the ROM region is free from errors such as inadvertent erasure or misrecording, since there is no light absorptive layer 3 in this region. Further, at the region where the light absorptive layer 3 exist, the user can record optional data as he wishes. And, this recorded data can be reproduced with the signals prescribed by the CD standards, and therefore can be reproduced by commercially available CD players in the same manner as the information recorded on the ROM region.

Now, the present invention will be described in detail with reference to Examples. However, it should be understood that the present invention is by no means restricted to such specific Examples.

EXAMPLE 1

A polycarbonate substrate of a disk shape thickness of 1.2 mm, an outer diameter of 120 mm and an inner diameter of 15 mm and having a spiral pregroove formed on its surface with a width of 0.4 $\mu$m, a depth of 130nm and a pitch of 1.6 $\mu$m, was formed by injection molding.

As a cyanine dye, 0.55 g of 1,1'-dibutyl-3,3,3',3'-tetramethyl-4,5,4',5'-dibenzoindodicarbocyanine perchlorate (product number NK3219, manufactured by Nippon Kanko Shikiso K.K.) was dissolved in 10 m$\lambda$ of an acetylacetone solvent, and the solution was spin-coated at a rotational speed of 3000 rpm for about 5 seconds. When the film-forming started, the rotational speed was reduced to 300 rpm, and the rotation was continued until the film was sufficiently dried to form a light absorptive layer having a thickness ($d_g$) of 150 nm. The depth ($d_{abs}$) in the groove of this light absorptive layer was 62 nm, and the complex refractive index ($n_{abs}$) was 2.7. The wavelength ($\lambda$) of the reading laser beam was 780 nm, and the optical parameter ($\rho$) at that time was 0.5. Further, since the refractive index ($n_{sub}$) of the polycarbonate as the substrate material was 1.58, the optical phase difference ($\Delta S$) between the pregroove and the land in the non-recorded state was 0.056.

Over the entire surface of this disk, a gold film having a thickness of 60 nm was formed by a vacuum deposition method. Further, on this reflective layer, an ultraviolet curable resin was spin-coated and then cured by irradiation with ultraviolet rays, to form a protective layer having a thickness of 10 $\mu$m.

To the optical information recording medium thus obtained, a semiconductor laser having a wavelength of 780 nm was irradiated at a linear speed of 1.2 m/sec with a recording power of 6.8 mW, to record EFM signals. Then, this optical information recording medium was played back by a commercially available CD player (Aurex XR-V73, wavelength of the reading laser beam $\lambda=780$ nm, a laser with a reading power of 0.5 mW), whereby the reflectance of the optical information recording medium was 73.5%, $I_{11}/I_{top}$ obtained from the eye pattern of the read-out signals was 0.78, $I_3/I_{top}$ was 0.45, the block error rate was $2.0 \times 10^{-3}$, and the push-pull value was 0.067. Thus, the optical information recording medium fully satisfies the requirements prescribed in the CD standards.

EXAMPLE 2

On a polycarbonate substrate molded in the same manner as in Example 1, 0.65 g of the same cyanine dye as used in Example 1 dissolved in 10 m$\lambda$ of an acetylacetone solvent, was coated by spin coating at a rotational speed of 2500 rpm for about 5 seconds. When the film-forming started, the rotational speed was reduced to 800 rpm and the rotation was continued until the film was sufficiently dried to form a light absorptive layer having a thickness ($d_g$) of 160 nm.

The depth ($d_{abs}$) in the groove of this light absorptive layer was 75 nm, and the complex refractive index ($n_{abs}$) was 2.7. The wavelength ($\lambda$) of the reading laser beam was 780 nm, and the optical parameter ($\rho$) at that time was 0.55. Further, since the refractive index ($n_{sub}$) of the polycarbonate as the substrate material was 1.58, the optical phase difference ($\Delta S$) between the pregroove and the land in a non-recorded state was 0.15.

Over the entire surface of this disk, a gold film having a thickness of 60 nm was formed by a vacuum deposition method. Further, on this light reflective layer, an ultraviolet curable resin was spin-coated and cured by irradiation with ultraviolet rays to form a protective layer having at thickness of 10 $\mu$m.

To the optical information recording medium thus obtained, a semiconductor laser having a wavelength of 780 nm was irradiated at a linear speed of 1.2 m/sec with a recording power of 6.8 mW, to record EFM signals, in the same manner as in Example 1. Then, this optical information recording medium was played back by a commercially available CD player, whereby the reflectance of the optical information recording medium was 70.3%, $I_{11}/I_{top}$ obtained from the eye pattern of the read-out signals, was 0.75, $I_3/I_{top}$ was 0.42, the block error rate was $2.2 \times 10^{-2}$, and the push-pull value was 0.069. This optical information recording medium sufficiently satisfies the requirements prescribed in the CD standards.

EXAMPLE 3

A polycarbonate substrate of a disk shape having a thickness of 1.2 mm, an outer diameter of 120 mm and an inner diameter of 15 mm and having a spiral pregroove formed on its surface with a width of 0.3 μm, a depth of 180 nm and a pitch of 1.6 μm, was formed by injection molding. To the polycarbonate substrate molded in this manner, 0.50 g of the same cyanine dye as used in Example 1 dissolved in 10 mλ of an acetylacetone solvent, was coated by spin coating at a rotational speed of 3000 rpm for about 5 seconds. When the film-forming started, the rotational speed was reduced to 300 rpm, and the rotation was continued until the film was sufficiently dried to form a light absorptive layer having a thickness ($d_g$) of 140 nm.

The depth ($d_{abs}$) in the groove of this light absorptive layer was 66 nm and the complex refractive index ($n_{abs}$) was 2.7. The wavelength (λ) of the reading laser beam was 780 nm, and the optical parameter (ρ) at that time was 0.48. Further, since the refractive index ($n_{sub}$) of the polycarbonate as the substrate material was 1.58, the optical phase difference (ΔS) between the pregroove and the land in a non-recorded state was −0.068.

Over the entire surface of this disk, a reflective layer and a protective layer were formed in the same manner as in Example 1. To the optical information recording medium thus obtained, a semiconductor laser having a wavelength of 780 nm was irradiated at a linear speed of 1.2 m/sec with a recording power of 6.8 mW, to record EFM signals. Then, this optical information recording medium was played back by a commercially available CD player, whereby the reflectance of the optical information recording medium was 77.5%, $I_{11}/I_{top}$ obtained from the eye pattern of the read-out signals, was 0.65, $I_3/I_{top}$ was 0.40, the block error rate was 5.2 × 10⁻³, and the push-pull value was 0.055. This optical information recording medium sufficiently satisfies the requirements prescribed in the CD standards.

EXAMPLE 4

A polycarbonate substrate having a thickness of 1.2 mm, an outer diameter of 120 mm and an inner diameter of 15 mm and having a spiral pregroove formed on its surface with a width of 0.8 μm, a depth of 180 nm and a pitch of 1.6 μm, was formed by injection molding. To the polycarbonate substrate thus molded, 0.60 g of the same cyanine dye as used in Example 1 dissolved in 10 mλ of an acetylacetone solvent, was coated by spin coating method at a rotational speed of 2500 rpm for about 5 seconds. When the film-forming started, the rotational speed was reduced to 1500 rpm, and the rotation was continued until the film was sufficiently dried to form a light absorptive layer having a thickness ($d_g$) of 150 nm.

The depth ($d_{abs}$) in the groove of this light absorptive layer was 118 nm and the complex refractive index ($n_{abs}$) was 2.7. The wavelength (λ) of the reading laser beam was 780 nm, and the optical parameter (ρ) at that time was 0.52. Further, since the refractive index ($n_{sub}$) of the polycarbonate as the substrate material was 1.58, the optical phase difference (ΔS) between the pregroove and the land in a non-recorded state was 0.3.

Over the entire surface of this disk, a reflective layer and a protective layer were formed in the same manner as in Example 1.

To the optical information recording medium thus obtained, a semiconductor laser having a wavelength of 780 nm was irradiated at a linear speed of 1.2 m/sec with a recording power of 6.8 mW, to record EFM signals. Then, this optical information recording medium was played back by a commercially available CD player, whereby the reflectance of the optical information recording medium was 70.0%, $I_{11}/I_{top}$ obtained from the eye pattern of the read-out signals, was 0.61, $I_3/I_{top}$ was 0.32, the block error rate was 5.5 × 10⁻³, and the push-pull value was 0.070. This optical information recording medium fully satisfies the requirements prescribed in the CD standards.

EXAMPLE 5

A polycarbonate substrate having a thickness of 1.2 mm, an outer diameter of 120 mm and an inner diameter of 15 mm and having a spiral pregroove formed with a width of 0.4 μm, a depth of 180 nm and a pitch of 1.6 μm, was formed by injection molding. To the polycarbonate substrate thus molded, a solution having 0.65 g of the same cyanine dye as used in Example 1 dissolved in 10 mλ of an acetylacetone solvent and having 0.1 g of 6-nylon (Mw=35000) further dissolved, was coated by spin coating at a rotational speed of 3000 rpm for about 5 seconds. When the film-forming started, the rotational speed was reduced to 300 rpm, and the rotation was continued until the film was sufficiently dried to form a light absorptive layer having a thickness ($d_g$) of 250 nm.

The depth ($d_{abs}$) in the groove of this light absorptive layer was 10 nm and the complex refractive index ($n_{abs}$) was 2.4. The wavelength (λ) of the reading laser beam was 780 nm, and the optical parameter (ρ) at that time was 0.77. Further, since the refractive index ($n_{sub}$) of the polycarbonate as the substrate material was 1.58, the optical phase difference (ΔS) between the pregroove and the land in a non-recorded state was −0.32.

Over the entire surface of this disk, a reflective layer and a protective layer were formed in the same manner as in Example 1.

To the optical information recording medium thus obtained, a semiconductor laser having a wavelength of 780 nm was irradiated at a linear speed of 1.2 m/sec with a recording power of 6.8 mW, to record EFM signals, in the same manner as in Example 1. Then, this optical information recording medium was played back by a commercially available CD player, whereby the reflectance of the optical information recording medium was 70.5%, $I_{11}/I_{top}$ obtained from the eye pattern of the read-out signals, was 0.65, $I_3/I_{top}$ was 0.35, the block error rate was 3.0 × 10⁻², and the push-pull value was 0.048. This optical information recording medium fully satisfies the requirements prescribed in the CD standards.

EXAMPLE 6

A polycarbonate substrate of a disk shape having a thickness of 1.2 mm, an outer diameter of 120 mm and an inner diameter of 15 mm and having spiral prepits 8 capable of reproducing CD formatted signals formed with a width of 0.6 μm, a depth of 0.08 μm and a pitch in a range of the diameter of from 46 to 100 mm (ROM region) and having spiral pregroove formed with a width of 0.8 μm, a depth of 50 nm and a pitch of 1.6 μm in a range of a diameter of from 100 to 117 mm (recordable region) outside the ROM region, was formed by injection molding. To the portion outside the diameter of 100 mm i.e. the recordable region only, of the polycarbonate substrate thus formed, 0.55 g of the same cyanine dye as used in Example 1 dissolved in 10 mλ of an acetylacetone solvent, was coated by spin coating at a rotational speed of 3000 rpm for about 5 seconds. When the film-forming started, the rotational speed was reduced to 300 rpm, and the rotation was continued until the film was sufficiently dried to form a light absorptive layer having a thickness ($d_g$) of 150 nm.

The depth ($d_{abs}$) in the groove of this light absorptive layer was 40 nm and the complex refractive index ($n_{abs}$) was 2.7. The wavelength (λ) of the reading laser beam was 780 nm, and the optical parameter (ρ) at that time was 0.52. Further, since the refractive index ($n_{sub}$) of the polycarbonate as the substrate material was 1.58, the optical phase difference (ΔS) between the pregroove and the land in a non-recorded state was 0.13.

Over the entire surface of this disk, a reflective layer and a protective layer were formed in the same manner as in Example 1.

To the recordable region of the optical information recording medium thus obtained, a semiconductor laser having a wavelength of 780 nm was irradiated at a linear speed of 1.2 m/sec with a recording power of 6.8 mW, to record EFM signals, in the same manner as in Example 1. Then, this optical information recording medium was played back by a commercially available CD player, whereby the reflectance of the optical information recording medium was 75.0%, $I_{11}/I_{top}$ obtained from the eye pattern of the read-out signals, was 0.60, $I_3/I_{top}$ was 0.31, the block error rate was $6.0 \times 10^{-3}$, and the push-pull value was 0.070. This optical information recording medium fully satisfies the requirements prescribed in the CD standards.

COMPARATIVE EXAMPLE 1

To the same polycarbonate substrate as molded in Example 1, 0.55 g of the same cyanine dye as used in Example 1 dissolved in 10 mλ of an acetylacetone solvent, was coated by spin coating at a rotational speed of 3000 rpm, and the rotation was continued until the film was sufficiently dried to form a light absorptive layer having a thickness ($d_g$) of 130 nm.

The depth ($d_{abs}$) in the groove of this light absorptive layer was 105 nm and the complex refractive index ($n_{abs}$) was 2.7. The wavelength (λ) of the reading laser beam was 780 nm, and the optical parameter (ρ) at that time was 0.45. Further, since the refractive index ($n_{sub}$) of the polycarbonate as the substrate material was 1.58, the optical phase difference (ΔS) between the pregroove and the land in a non-recorded state was 0.35.

Over the entire surface of this disk, a gold film having a thickness of 60 nm was formed by a vacuum vapor deposition. Further, on this reflective layer, an ultraviolet curable resin was spin-coated and then cured by irradiation with ultraviolet rays, to form a protective layer having a thickness of 10 μm.

To the optical information recording medium thus obtained, a semiconductor laser having a wavelength of 780 nm was irradiated at a linear speed of 1.2 m/sec at a recording power of 6.8 mW, to record EFM signals in the same manner as in Example 1. Then, this optical information recording medium was played back by a commercially available CD player, whereby the reflectance of the optical information recording medium was 63.0%, $I_{11}/I_{top}$ obtained by the eye pattern of the read-out signals was 0.75, $I_3/I_{top}$ was 0.52, the block error rate was $3.0 \times 10^{-3}$, and the push-pull value was 0.087. Thus, when ΔS is 0.35, the reflectance is low, and the push-pull value is poor, whereby the requirements prescribed in the CD standards can not be satisfied.

EXAMPLE 7

A polycarbonate substrate of a disk shape having a thickness of 1.2 mm, an outer diameter of 120 mm and an inner diameter of 15 mm and having a spiral pregroove 6 formed with a width of 0.5 μm, a depth of 100 nm and a pitch of 1.6 μm, was formed by injection molding.

As a cyanine dye, 0.65 g of 1,1'-dibutyl-3,3,3,',3'-tetramethyl-4,5,4',5'-dibenzoindodicarbocyanine perchlorate (NK-3219, manufactured by Nippon Kanko Shikiso K.K.) was dissolved in 10 mλ of diacetone alcohol, and the solution was spin-coated on the above substrate by changing properly the rotational sped, to form a light absorptive layer having an average thickness $d_{av}$ of 140 nm.

The depth ($d_{abs}$) in the pregroove 6 of this light absorptive layer was 49 nm and the complex refractive index ($n_{abs}$) was 2.7. The wavelength (λ) of the reading laser beam was 780 nm, and the optical parameter (ρ) at that time was 0.48. Further, since the refractive index ($n_{sub}$) of the polycarbonate as the substrate material was 1.58, the optical phase difference (ΔS) between the pregroove and the land in a non-recorded state was 0.052. Further, from the above results, the thickness ($d_{gr}$) of the pregroove 6 was 175 nm.

Over the entire surface of this disk, a gold film having a thickness of 60 nm was formed by a vacuum vapor deposition method. Further, on this light reflective layer, an ultraviolet curable resin was spin-coated and cured by irradiation with ultraviolet rays to form a protective layer having a thickness of 10 μm.

To the optical information recording medium thus obtained, a semiconductor laser having a wavelength of 780 nm was irradiated at a linear speed of 1.4 m/sec for recording, whereby the optimum recording power was 7.2 mW. With this power, EFM signals were recorded at the pregroove portion, and the optical information recording medium was played back by a commercially available CD player (Aurex XR-V73, wavelength of the reading laser beam: 780 nm, a laser having a read-out power of 0.5 mW), whereby the reflectance of the optical information recording medium was 77.3%, the degree of modulation $I_{11}/I_{top}$ obtained from the eye pattern of the read-out signals was 0.73, $I_3/I_{top}$ was 0.42, the block error rate was $1.6 \times 10^{-3}$, and the push-pull value was 0.067. This optical information recording medium sufficiently satisfies the requirements prescribed in the CD standards.

COMPARATIVE EXAMPLE 2

To the land portion in the non-recorded area of the optical information recording medium prepared in Example 7, EFM signals were recorded at a linear speed of 1.4 m/sec with the optimum recording power using a semiconductor laser having a wavelength of 780 nm. Then, this recorded portion was played back in the same manner as in Example 7, whereby the block error rate was $5.0 \times 10^{-2}$, and the push-pull value during the play back was 0.019. Each of these values does not satisfy the CD standards.

EXAMPLE 8

To the polycarbonate substrate molded in the same manner as in Example 7, 0.78 g of the same cyanine dye as used in Example 7 dissolved in 10 mλ of a diacetone alcohol solvent, was coated by spin coating by appropriately changing the rotational speed. The thickness ($d_{av}$) after the film-formation was 260 nm.

The depth ($d_{sub}$) in the pregroove of this light absorptive layer was 57 nm, and the complex refractive index ($n_{abs}$) was 2.7. The wavelength ($\lambda$) of the reading laser beam was 780 nm, and the optical parameter ($\rho$) at that time was 0.90.

Further, $\Delta S$ in a non-recorded state at that time was 0.11.

The thickness ($d_{gr}$) of the light absorptive layer in the pregroove was 290 nm.

Over the entire surface of this disk, a gold film having a thickness of 60 nm was formed by a vacuum vapor deposition method. Further, on this light reflective layer, an ultraviolet curable resin was spin-coated and cured by irradiation with ultraviolet rays to form a protective layer having a thickness of 10 μm.

To the optical information recording medium thus obtained, a semiconductor laser having a wavelength of 780 nm was irradiated at a linear speed of 1.4 m/sec for recording in the same manner as in Example 7, whereby the optimum recording power was 5.2 mW. With this power, EFM signals were recorded at the pregroove portion of the optical information recording medium. Then, the recorded portion was played back in the same manner as in Example 7, whereby the reflectance was 73.2%, $I_{11}/I_{top}$ of the read-out signals was 0.85, $I_3/I_{top}$ was 0.45, the block error rate was $2.2 \times 10^{-3}$, and the push-pull value was 0.053. This optical information recording medium fully satisfies the requirements prescribed in the CD standards.

COMPARATIVE EXAMPLE 3

To the land portion in the non-recorded area of the optical information recording medium prepared in Example 8, EFM signals were recorded at a linear speed of 1.4 m/sec at the optimum recording power using a semiconductor laser having a wavelength of 780 nm. Then, this recorded portion was played back in the same manner as in Example 7, whereby the block error rate was $7.8 \times 10^{-2}$, and the push-pull value during the play back was 0.022. Each of these values does not satisfy the CD standards.

EXAMPLE 9

A polycarbonate substrate of a disk shape having a thickness of 1.2 mm, an outer diameter of 120 mm and an inner diameter of 15 mm and having a spiral pregroove formed with a width of 0.7 μm, a depth of 100 nm and a pitch of 1.6 μm, was formed by injection molding.

As a cyanine dye, 0.70 g of 1,1'-dibutyl-3,3,3',3'-tetramethyl-4,5,4',5'-dibenzoindodicarbocyanine perchlorate (NK-3219, manufactured by Nippon Kanko Shikiso K.K.) was dissolved in 10 mλ of diacetone alcohol. This solution was spin-coated on the above substrate by appropriately changing the rotational speed, to form a light absorptive layer having an average thickness $d_{av}$ of 210 nm.

The depth ($d_{abs}$) in the pregroove of this light absorptive layer was 12 nm, and the complex refractive index ($n_{abs}$) was 2.7. Since the wavelength ($\lambda$) of the reading laser beam was 780 nm, the optical parameter ($\rho$) at that time was 0.73. Further, since the refractive index ($n_{sub}$) of the polycarbonate as the substrate material was 1.58, the optical phase difference ($\Delta S$) between the pregroove and the land in a non-recorded state was $-0.20$.

Further, from the above results, the thickness ($d_{1n}$) at the land was 172 nm.

Over the entire surface of this disk, a gold film having a thickness of 60 nm was formed by a vacuum vapor deposition method. Further, on this light reflective layer, an ultraviolet curable resin was spin-coated and cured by irradiation with ultraviolet rays to form a protective layer having a thickness of 10 μm.

To the optical information recording medium thus obtained, a semiconductor laser having a wavelength of 780 nm was irradiated at a linear speed of 1.4 m/sec for recording, whereby the optimum recording power was 6.5 mW. With this power, EFM signals were recorded on the land portion, whereby the reflectance of the optical information recording medium was 74.5%, $I_{11}/I_{top}$ obtained from the eye pattern of the read-out signals, was 0.82, $I_3/I_{top}$ was 0.42, the block error rate was $1.8 \times 10^{-3}$, and the push-pull value was 0.048. This optical information recording medium fully satisfies the requirements prescribed in the CD standards.

COMPARATIVE EXAMPLE 4

To the pregroove portion in the non-recorded area of the optical information recording medium prepared in Example 9, EFM signals were recorded at a linear speed of 1.4 m/sec with the optimum recording power using a semiconductor laser having a wavelength of 780 nm. Then, this recorded portion was played back in the same manner as in Example 9, whereby the block error rate was $8.5 \times 10^{-2}$, and the push-pull value during the play back was 0.009. Each of these values does not satisfy the CD standards.

EXAMPLE 10

A polycarbonate substrate molded in the same manner as in Example 9, 0.85 g of the same cyanine dye as used in Example 9 dissolved in 10 mλ of diacetone alcohol solvent, was coated by spin coating by appropriately changing the rotational speed. The thickness ($d_{av}$) after the film forming was 240 nm.

The depth ($d_{sub}$) in the pregroove of this light absorptive layer was 10 nm, and the complex refractive index ($n_{abs}$) was 2.7. The wavelength ($\lambda$) of the reading laser beam was 780 nm, and the optical parameter ($\rho$) at that time was 0.83. Further, $\Delta S$ in a non-recorded state at that time was $-0.22$. Further, $\Delta S$ in a non-recorded state at that time was $-0.22$. Further, the thickness ($d_{1n}$) of the light absorptive layer on the land was 201 nm.

Over the entire surface of this disk, a gold film having a thickness of 60 nm was formed by a vacuum vapor deposition method. Further, on this light reflective layer, an ultraviolet curable resin was spin-coated and then cured by irradiation with ultraviolet rays to form a protective layer having a thickness of 10 μm.

To the optical information recording medium thus obtained, a semiconductor laser having a wavelength of 780 nm was irradiated at a linear speed of 1.4 m/sec for recording in the same manner as in Example 9, whereby the optimum recording power was 6.0 mW. With this power, EFM signals were recorded at the pregroove portion of the optical information recording medium. Then, the recorded portion was played back in the same manner as in Example 9, whereby the reflectance was 72.1%, $I_{11}/I_{top}$ of the read-out signals was 0.84, $I_3/I_{top}$ was 0.42, the block error rate was $1.9 \times 10^{-3}$, and the push-pull value was 0.052. Further, the push-pull value at the non-recorded portion was also 0.052. Thus, this optical information recording medium fully satisfies the requirements prescribed in the CD standards.

COMPARATIVE EXAMPLE 5

To the pregroove portion in the non-recorded area of the optical information recording medium prepared in Example 10, EFM signals were recorded at a linear speed of 1.4 m/sec with the optimum recording power using a semiconductor laser having a wavelength of 780 nm. Then, this recorded portion was played back in the same manner as in Example 9, whereby the block error rate was $8.0 \times 10^{-1}$, and the push-pull value during the play back was 0.012. Each of these values does not satisfy the CD standards.

As described in the foregoing, according to the present invention, by adjusting the optical phase difference $\Delta S$, the thickness of the light absorptive layer at the land portion and the depth of the pregroove to prescribed levels, it is possible to provide an optical information recording medium capable of satisfying he values prescribed in the current CD standards, particularly the push-pull value prescribed in the CD standards as well as the prescribed values for the reflectance and the degree of modulation, and a method for recording on such an optical information recording medium.

What is claimed is:

1. An optical information recording medium comprising:
   a light transmitting substrate having a pregroove formed on a surface thereof, a land being provided at at least one side of the pregroove,
   a light absorptive layer of a coloring matter formed on the substrate directly or with another layer interposed therebetween, and
   a light reflective layer, separate from the light absorptive layer made of a metal film formed on the light absorptive layer directly or with other layer interposed therebetween,
   wherein $\Delta S \leq 0.3$, $\Delta S$ being the optical phase difference between light reflected by the light reflective layer at the pregroove and at the land and being represented by $\Delta S = 2d_{sub}\{n_{sub} - n_{abs}(1 - d_{abs}/d_{sub})\}/\lambda$, and
   wherein $d_{sub}$ is the depth of a first layer boundary at a substrate side of the light absorptive layer from the land to a bottom of the pregroove, $d_{abs}$ is the depth of a second layer boundary at a light absorptive layer side of the light reflective layer from a portion thereof at the land to a portion thereof at eh pregroove, $n_{sub}$ is the real part of the complex refractive index of the substrate and any layer present on the substrate side of the light absorptive layer, $n_{abs}$ is the real part of the complex refractive index of the light absorptive layer, and $\lambda$ is the wavelength of a laser beam reflected from the recording medium.

2. The optical information recording medium according to claim 1, wherein $d_{sub}$ is $d_{sub} \geq 50$ nm.

3. The optical information recording medium according to claim 1, wherein the light absorptive layer is formed on a part of the light transmitting substrate and a ROM area wherein pits for read-out signals are already formed, is provided at the region where the light absorptive layer is absent.

4. An optical information recording medium comprising:
   a light transmitting substrate having a pregroove formed on a surface thereof, a land being provided at each side of the pregroove,
   a light absorptive layer of a coloring matter formed on the substrate, and
   a light reflective layer, separate from the light absorptive layer, made of a metal film formed on the light absorptive layer,
   wherein $0.3 \leq \Delta S \leq 0.3$, $\Delta S$ being the optical phase difference between a reading laser beam reflected from the light reflective layer at a portion thereof corresponding to the pregroove and the reading laser beam reflected from the light reflective layer at a portion thereof corresponding to the land located on each side of the pregroove,
   wherein $\Delta S = 2d_{sub}\{n_{sub} - n_{abs}(1 - d_{abs}/d_{sub})\}/\lambda$, and
   wherein $d_{sub}$ is the depth of a first layer boundary at a substrate side of the light absorptive layer from the land to a bottom of the pregroove, $d_{abs}$ is the depth of a second layer boundary at a light absorptive layer side of the light reflective layer from a portion thereof at the land to a portion thereof at the pregroove, $n_{sub}$ is the real part of the complex refractive index of the substrate and any layer present on the substrate side of the light absorptive layer, $n_{abs}$ is the real part of the complex refractive index of the light absorptive layer, and $\lambda$ is the wavelength of the reading laser beam; and 90 nm $\leq d_{gr} \leq 350$ nm wherein $d_{gr}$ is a thickness of the light absorptive layer at a portion corresponding to the pregroove.

5. The optical information recording medium according to claim 4, wherein $0.05 \leq \rho \leq 1.6$, wherein $\rho = n_{abs} \cdot d_{av}/\lambda$, wherein $d_{av}$ is the average thickness of the light absorptive layer.

6. The optical information recording medium according to claim 5, wherein $k_{abs} \leq 0.3$ wherein $k_{abs}$ is the imaginary part of the complex refractive index of the light absorptive layer.

7. An optical information recording medium comprising:
   a light transmitting substrate having a pregroove formed on a surface thereof, a land being positioned on each side of the pregroove,
   a light absorptive layer of a coloring matter formed on the substrate, and
   a light reflective layer, separate from the light absorptive layer, made of a metal film formed on the light absorptive layer,
   wherein $-0.4 \leq \Delta S \leq -0.04$, $\Delta S$ being the optical phase difference between a reading laser beam reflected from the light reflective layer at a portion thereof corresponding to the pregroove and the reading laser beam reflected from the light reflective layer at a portion thereof corresponding to the land located on each side of the pregroove,
   wherein $\Delta S = 2d_{sub}\{n_{sub} - n_{abs}(1 - d_{abs}/d_{sub})\}/\lambda$, and
   wherein $d_{sub}$ is the depth of a first layer boundary at a substrate side of the light absorptive layer from the land to a bottom of the pregroove, $d_{abs}$ is the depth of a second layer boundary at a light absorptive layer side of the light reflective layer from a portion thereof at the land to a portion thereof at the pregroove, $n_{sub}$ is the real part of the complex refractive index of the substrate and any layer present on the substrate side of the light absorptive layer, $n_{abs}$ is the real part of the complex refractive index of the light absorptive layer, and $\lambda$ is the wavelength of the reading laser beam; and 90 nm $\leq d_{ln} \leq 350$ nm wherein $d_{ln}$ is a thickness of the light absorptive layer at a portion corresponding to the land.

8. The optical information recording medium according to claim 7, wherein $0.05 \leq \rho \leq 1.6$ wherein $\rho = n_{abs} \cdot d_{av}/\lambda$ wherein $d_{av}$ is the average thickness of the light absorptive layer.

9. The optical information recording medium according to claim 8, wherein $k_{abs} \leq 0.3$ wherein $k_{abs}$ is the imaginary part of the complex refractive index of the light absorptive layer.

10. An optical information recording medium comprising:
 a light transmitting substrate having a pregroove formed on a surface thereof, a land being positioned on each side of the pregroove,
 a light absorptive layer of a coloring matter formed on the substrate, and
 a light reflective layer, separate from the light absorptive layer, made of a metal film formed on the light absorptive layer, wherein $0.03 \leq \Delta S \leq 0.3$, $\Delta S$ being the optical phase difference between a reading laser beam reflected from the light reflective layer at a portion thereof corresponding to the pregroove and the reading laser beam reflected from the light reflective layer at a portion thereof corresponding to the land located on each side of the pregroove,
 wherein $\Delta S = 2d_{sub}\{n_{sub} - n_{abs}(1 - d_{abs}/d_{sub})\}/\lambda$, and
 wherein $d_{sub}$ is the depth of a first layer boundary on a substrate side of the light absorptive layer from the land to a bottom of the pregroove, $d_{abs}$ is the depth of a second layer boundary at a light absorptive layer side of the light reflective layer from a portion thereof at the land to a portion thereof at the pregroove, $n_{sub}$ is the real part of the complex refractive index of the substrate and any layer present on the substrate side of the light absorptive layer, $n_{abs}$ is the real part of the complex refractive index of the light absorptive layer, and $\lambda$ is the wavelength of the reading laser beam; and 90 nm $\leq d_{gr} \leq 350$ nm wherein $d_{gr}$ is the thickness of the light absorptive layer at a portion corresponding to the pregroove; and $d_{sub} \leq$ nm.

11. The optical information recording medium according to claim 10, wherein $0.05 \leq \rho \leq 1.6$, wherein $\rho = n_{abs} \cdot d_{av}/\lambda$ wherein $d_{av}$ is the average thickness of the light absorptive layer.

12. The optical information recording medium according to claim 11, wherein $k_{abs} \leq 0.3$ wherein $k_{abs}$ is the imaginary part of the complex refractive index of the light absorptive layer.

13. An optical information recording medium comprising:
 a light transmitting substrate having a pregroove formed on a surface thereof, a land being positioned on each side of the pregroove,
 a light absorptive layer of a coloring matter formed on the substrate, and
 a light reflective layer, separate from the light absorptive layer, made of a metal film formed on the light absorptive layer,
 wherein $-0.4 \leq \Delta S \leq 0.04$, $\Delta S$ being the optical phase difference between a reading laser beam reflected from the light reflective layer at a portion thereof corresponding to the pregroove and the reading laser beam reflected from the light reflective layer at a portion thereof corresponding to the land located on each side of the pregroove,
 wherein $\Delta S = 2d_{sub}\{n_{sub} - n_{abs}(1 - d_{abs}/d_{sub})\}/\lambda$, and
 wherein $d_{sub}$ is the depth of a first layer boundary on a substrate side of the light absorptive layer to a bottom of the pregroove, $d_{abs}$ is the depth of a second layer boundary on a light absorptive layer side of the light reflective layer at the portion thereof at the land to a portion thereof at the pregroove, $n_{sub}$ is the real part of the complex refractive index of the substrate and any layer present on the substrate side of the light absorptive layer, $n_{abs}$ is the real part of the complex refractive index of the light absorptive layer, and $\lambda$ is the wavelength of the reading laser beam; and 90 nm $\leq d_{ln} \leq 350$ nm wherein $d_{ln}$ is the thickness of the light absorptive layer at a portion thereof corresponding to the land; and $d_{sub} \leq 40$ nm.

14. The optical information recording medium according to claim 13, wherein $0.05 \leq \rho \leq 1.6$ wherein $\rho = n_{abs} \cdot d_{av}/\lambda$ wherein $d_{av}$ is the average thickness of the light absorptive layer.

15. The optical information recording medium according to claim 14, wherein $k_{abs} \leq 0.3$ wherein $k_{abs}$ is the imaginary part of the complex refractive index of the light absorptive layer.

* * * * *

UNITED STATES PATENT AND TRADEMARK OFFICE
CERTIFICATE OF CORRECTION

PATENT NO.   : 5,080,946
DATED        : January 14, 1992
INVENTOR(S)  : Yosikazu Takagisi et al.

It is certified that error appears in the above-identified patent and that said Letters Patent is hereby corrected as shown below:

Column 24,
Line 9, change "0.3" (first occurrence) to -- 0.03 --;

Column 25,
Line 46, change "$d_{sub} \leqq$ nm" to -- $d_{sub} \leqq 40$ nm --;

Column 26,
Line 17, change "0.04" to -- -0.04 --; and
Line 39, change "$\leqq$" to -- $\geqq$ --.

Signed and Sealed this

Twenty-sixth Day of March, 2002

JAMES E. ROGAN
Director of the United States Patent and Trademark Office

Attest:

Attesting Officer